United States Patent [19]

Nakano et al.

[11] Patent Number: 4,836,016

[45] Date of Patent: Jun. 6, 1989

[54] METHOD AND APPARATUS FOR DETECTING ABNORMAL STATE IN PULSE TRAIN GENERATING SENSOR

[75] Inventors: Jiro Nakano, Okazaki; Yoshizo Ito, Toyota, both of Japan

[73] Assignee: Toyota Jidosha Kabushiki Kaisha, Toyota, Japan

[21] Appl. No.: 183,520

[22] Filed: Apr. 14, 1988

Related U.S. Application Data

[63] Continuation of Ser. No. 894,897, Aug. 8, 1986, abandoned.

[30] Foreign Application Priority Data

Aug. 10, 1985 [JP] Japan ................................ 60-174999
Sep. 2, 1985 [JP] Japan ................................ 60-191899
Apr. 14, 1986 [JP] Japan ................................ 61-84060

[51] Int. Cl.$^4$ ............................................. G01M 19/00
[52] U.S. Cl. .................................... 73/118.1; 377/20
[58] Field of Search ................... 73/117.3, 118.1, 116, 73/117.1; 364/550, 551, 507, 480, 487; 340/52 R, 635; 377/19, 20

[56] References Cited

U.S. PATENT DOCUMENTS

| | | | |
|---|---|---|---|
| 4,060,979 | 12/1977 | Elsaesser et al. | 73/117.3 |
| 4,402,217 | 9/1983 | Higashiyama | 73/117.3 |
| 4,517,831 | 5/1985 | Hirano | 73/116 |
| 4,537,065 | 8/1985 | Ootsuka et al. | 73/117.3 |
| 4,635,214 | 1/1987 | Kasai et al. | 364/551 |

FOREIGN PATENT DOCUMENTS 59-120420 of 0000 Japan.
60-53811 3/1985 Japan.
60-56220 4/1985 Japan.

Primary Examiner—Stewart J. Levy
Assistant Examiner—Robert R. Raevis
Attorney, Agent, or Firm—Cushman, Darby & Cushman

[57] ABSTRACT

In an internal combustion engine having a sensor which generates a pulse signal, a time period is measured during which the engine rotational speed is larger than a reference speed, and the time period is reset at every rise or fall of the pulse signal. As a result, when the measured time period is larger than a predetermined time period, an abnormal state signal is generated, thereby detecting an abnormal state of the sensor.

24 Claims, 19 Drawing Sheets

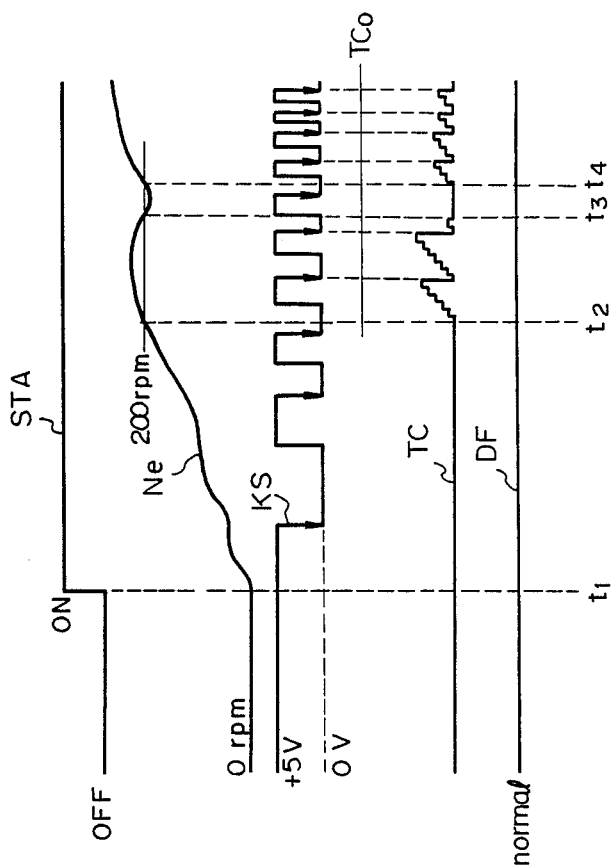

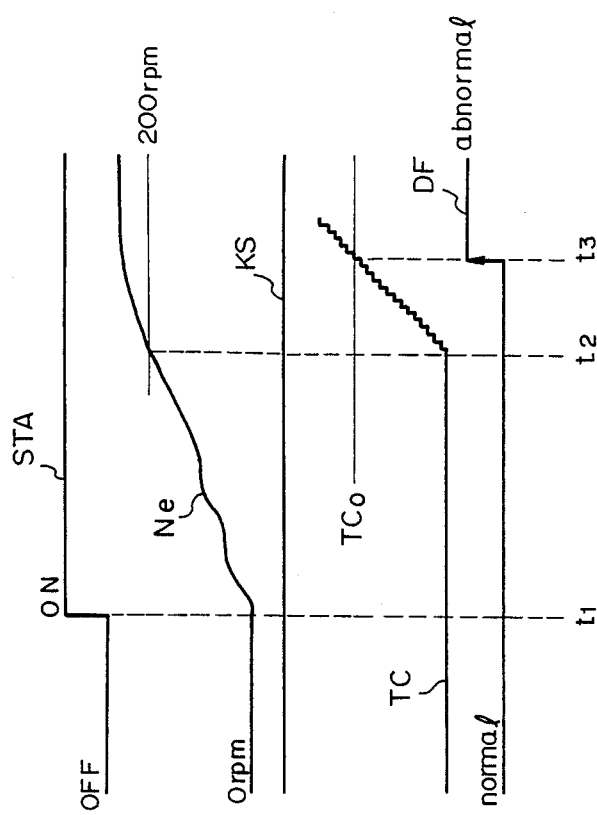

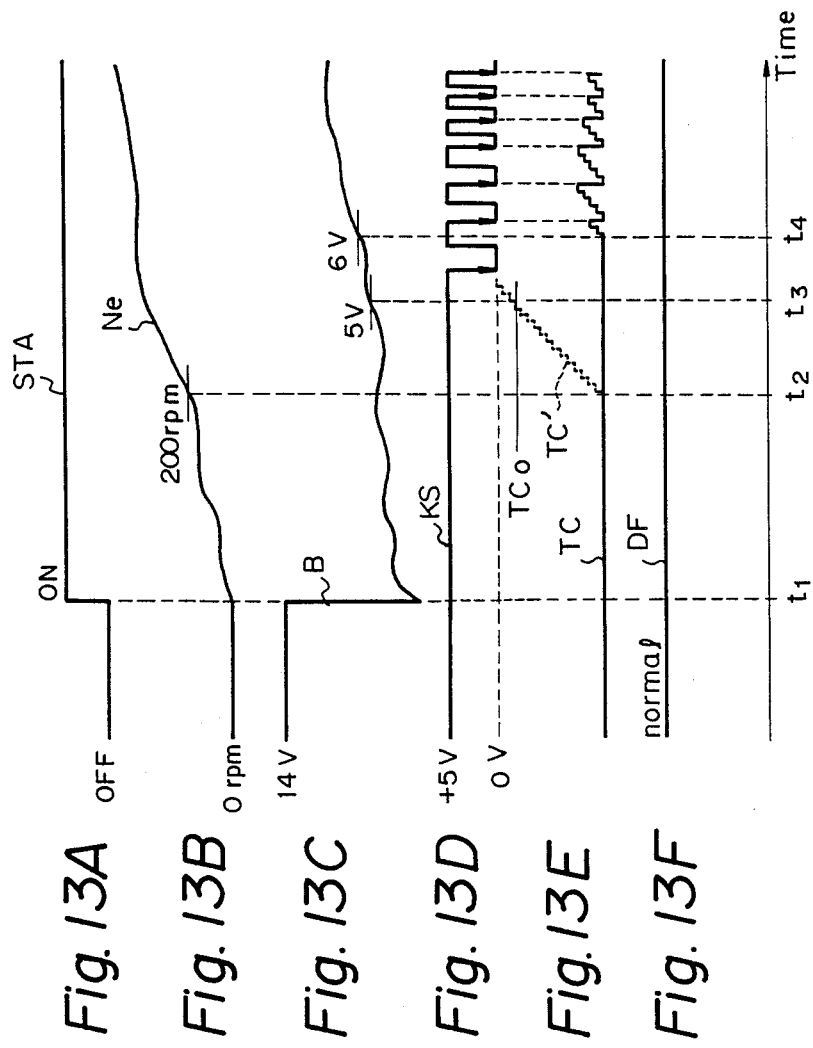

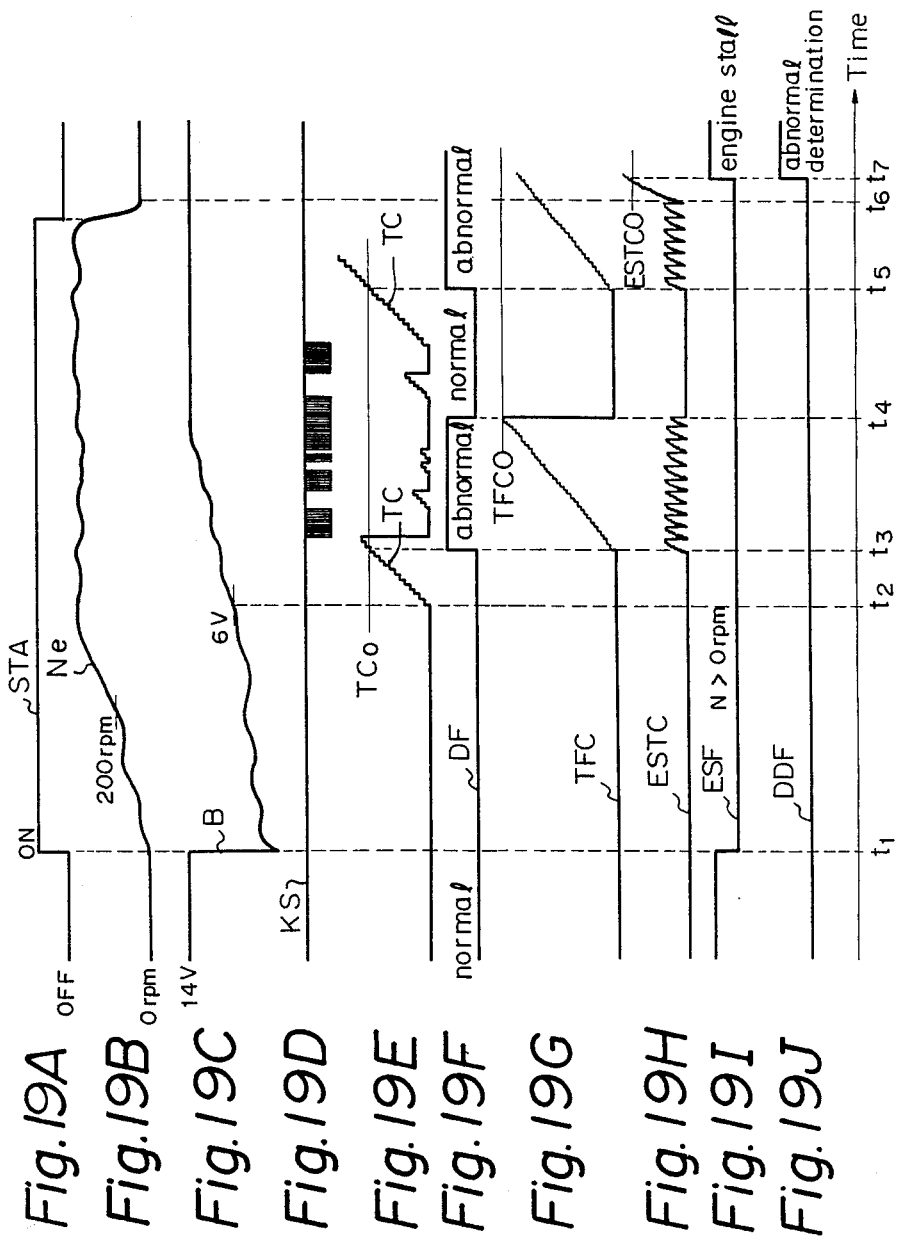

METHOD AND APPARATUS FOR DETECTING ABNORMAL STATE IN PULSE TRAIN GENERATING SENSOR

This is a continuation of application Ser. No. 894,897, filed Aug. 8, 1986, which was abandoned upon the filing hereof.

BACKGROUND OF THE INVENTION

1) Field of the Invention

The present invention relates to a method and apparatus for detecting an abnormal state in a pulse train generating sensor. Such a pulse train generating sensor can be used, for example, for measuring the flow rate of engine intake air.

2) Description of the Related Art

In order to electronically control an internal combustion engine at an optimum condition, sensors for accurately detecting a driving state, memory devices for storing data and programs, and a microprocessor and actuators for the fuel injection, the ignition timing, and the like are provided.

Among these elements, the sensors are very important and detection of an abnormal state of the sensors must be made at an early stage. For this purpose, various self diagnosis devices for detecting an abnormal state in the sensors have been proposed.

Note, the output characteristics of conventional sensors for measuring a driving state of the engine, especially sensors for measuring a load of the engine, are linear. In an abnormal state, the output voltages of such sensors are usually 0 V (ground voltage) or $V_{cc}$ (equal to the supply voltage). Thus, such an abnormal state can be detected by determining whether the output voltage of the sensors is 0 V or $V_{cc}$.

However, for pulse train generating sensors, for example, Karman vortex sensors which detect an intake air flow rate to the engine, it is impossible to detect an abnormal state by detecting the output voltage, since the outputs thereof are usually 0 V or $V_{cc}$. Accordingly, the above-mentioned diagnosis for detecting an abnormal state cannot be applied to pulse train generating sensors.

SUMMARY OF THE INVENTION

It is an object of the present invention to provide a method and apparatus for detecting an abnormal state in a pulse train generating sensor.

According to the present invention, the duration measured in during which the rotational speed is larger than a reference speed is measured. This duration is reset at every rise or fall of the pulse signal generated from a pulse train generating sensor. Then, an abnormal state signal is generated when the duration is larger than a predetermined duration. As a result, an abnormal state indication is indicated when the abnormal state signal is generated.

Thus, a determination of whether or not a pulse train generating sensor is in an abnormal state is constantly made.

BRIEF DESCRIPTION OF THE DRAWINGS

The present invention will be more clearly understood from the description as set forth below with reference to the accompanying drawings, wherein:

FIGS. 7A to 7E, FIGS. 8A to 8E, and FIGS. 9A to 9E are waveforms explaining the flowcharts of FIGS. 4, 5, and 6;

FIGS. 13A to 13F and FIGS. 14A to 14E are waveforms explaining the flowcharts of FIGS. 5, 11, and 12; and FIGS. 19A to 19J are waveforms explaining the flowcharts of FIGS. 5, 15, 16, 17, and 18.

DESCRIPTION OF THE PREFERRED EMBODIMENTS

Figure 1:
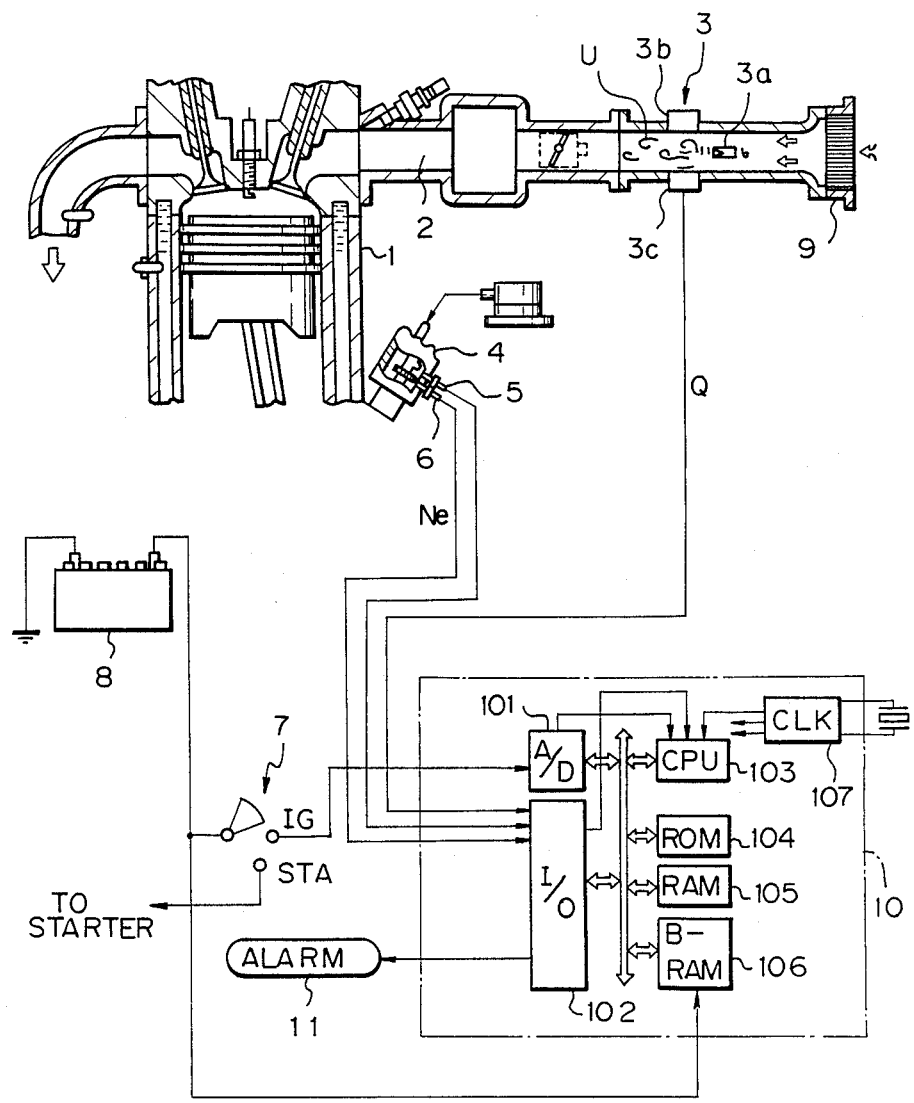
FIG. 1 is a schematic diagram of an internal combustion engine according to the present invention.

In FIG. 1, which illustrates an internal combustion engine according to the present invention, reference numeral 1 designates a four-cycle spark ignition engine disposed in an automotive vehicle. Provided in an air-intake passage 2 of the engine 1 is a rectifier grid 9 consisting of an aluminum honeycomb for making the air flow uniform. Reference numeral 3 denotes a Karman vortex type airflow sensor for detecting the amount of air taken into the engine 1 at the downstream side of the rectifier grid 9. The airflow sensor 3 consists of a vortex generator 3a, a supersonic-wave transmitter 3b, and a supersonic-wave receiver 3c. When air flows into the air-take passage 2, vortexes are generated downstream of the vortex generator 3a in the air-intake passage 2. The number of vortexes in a unit of time are calculated by the supersonic-wave transmitter 3b and the receiver 3c.

Figure 2:
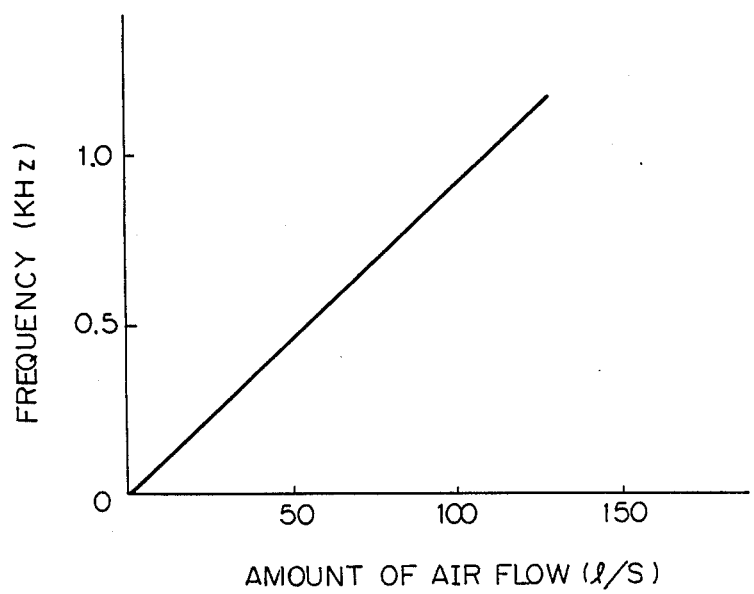
FIG. 2 is a graph showing the output characteristics of the Karman vortex sensor of FIG. 1.
Figure 3:
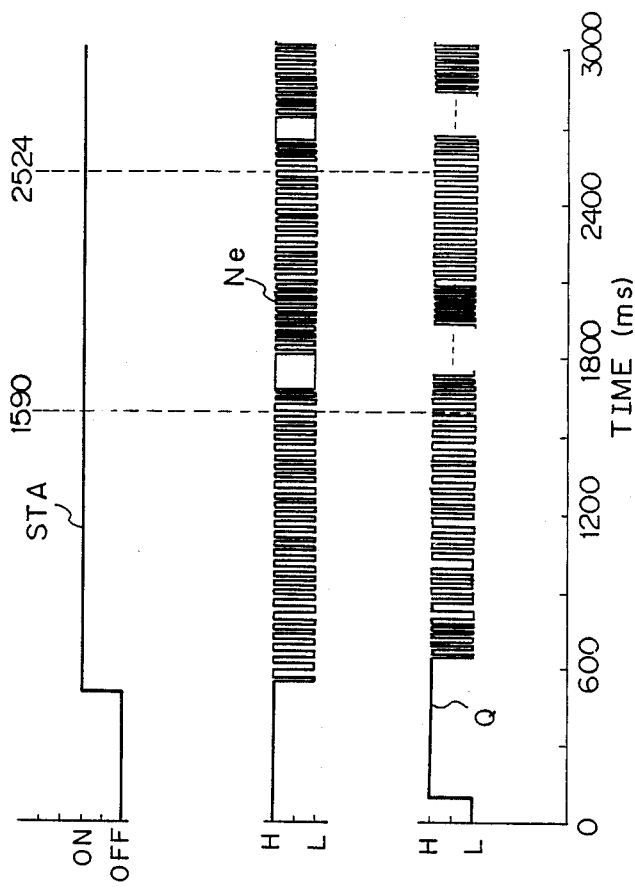
FIGS. 3A, 3B, 3C are graphs showing the waveforms of the signals appearing in the control circuit of FIG. 1.

Th output signal of the Karman vortex type air flow sensor 3 is pulse-shaped. That is, the output voltage thereof is at a low level (0 V) or at a high level (5 V) as shown in FIG. 3C, and the frequency thereof increases in proportion to the amount of air, as shown in FIG. 2. FIG. 3A shows a wave form of the signal for the starter (not shown) of the engine, and FIG. 3B shows a wave form from the engine crank angle sensor described hereafter. The output signal of the Karman vortex sensor 3 is transmitted to an input/output (I/O) interface 102 of a control circuit 10.

Note that other Karman vortex type airflow sensors, such as mirror vibration and reflection type, can be used.

Disposed in a distributor 4 are crank angle sensors 5 and 6 for detecting the angle of the crankshaft (not shown) of the engine 1. In this case, the crank-angle sensor 5 generates a pulse signal at every 720° crank angle (CA) and the crank-angle sensor 6 generates a pulse signal at every 30° CA. The pulse signals of the crank sensors 5 and 6 are supplied to the I/O interface 102 of the control circuit 10. In addition, the pulse signal of the crank angle sensor 6 is then supplied to an interruption terminal of a central processing unit (CPU) 103.

The battery 8 is connected directly to the backup RAM 106 and, therefore, the content thereof is never erased even when an key switch 7 is turned OFF. The key switch 7 has an IG position connected to a multiplexer-incorporating analog-to-ditigal (A/D) converter 101 of the control circuit 10, and an STA position connected to the starter (not shown).

The control circuit 10, which may be constructed by a microcomputer, further comprises a read-only memory (ROM) 104 for storing a main routine, interrupt routines such as a fuel injection routine, an ignition timing routine, tables (maps), and constants, etc., a random access memory 105 (RAM) for storing temporary data, a backup memory 106 (B-RAM), a clock generator 107 for generating various clock signals, and the like.

Interruptions occur at the CPU 103, when the A/D converter 101 completes an A/D conversion and generates an interrupt signal; when the crank angle sensor 6 generates a pulse signal; and when the clock generator 107 generates a special clock signal.

The intake air amount data Q of the airflow sensor 3 is sampled by an A/D conversion routine executed at every predetermined time period and is then stored in the RAM 105. That is, the data Q in the RAM 105 is renewed at every predetermined time period. The engine speed Ne is calculated by an interrupt routine executed at 30° CA, i.e., at every pulse signal of the crank angle sensor 6, and is then stored in the RAM 105.

Also connected to the I/O interface 102 is an alarm 11. The alarm 11 is activated when an abnormal state is detected in the air flow sensor 3.

The operation of the control circuit 10 of FIG. 1 will be explained with reference to the flow charts of FIGS. 4, 5, 6, 10, 11, 12, 13, 15, 16, 17, and 18.

Figure 4:
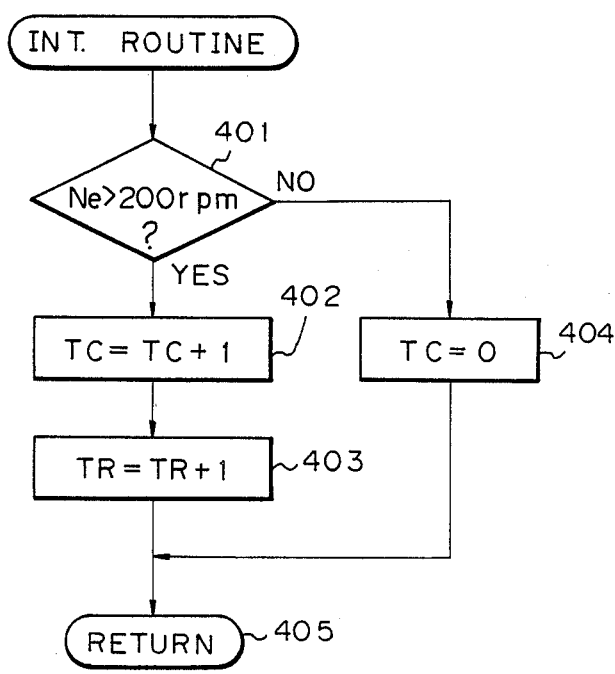
FIGS. 4, 5, 6, 10, 11, 12, 15, 16, 17, and 18 are flowcharts showing the operation of the control circuit of FIG. 1.

FIG. 4 is a routine executed at every predetermined period such as 4 ms. At step 401, it is determined whether or not the engine rotational speed Ne is larger than 200 rpm. If Ne>200 rpm, the control is transferred to step 402 where a counter TC for counting a time duration is counted up by 1, and then, at step 403, a counter TR for detecting a normal state is counted up by 1. Then the control proceeds to step 405. Contrary to this, if Ne≦200 rpm, at step 401, the control proceeds to step 404 which resets the counter TC, then the control proceeds to step 405.

Note that the counter TC is used for determining whether or not the air flow sensor 3 is in an abnormal state, and the counter TR is used for counting a predetermined time duration $TR_0$.

Figure 5:
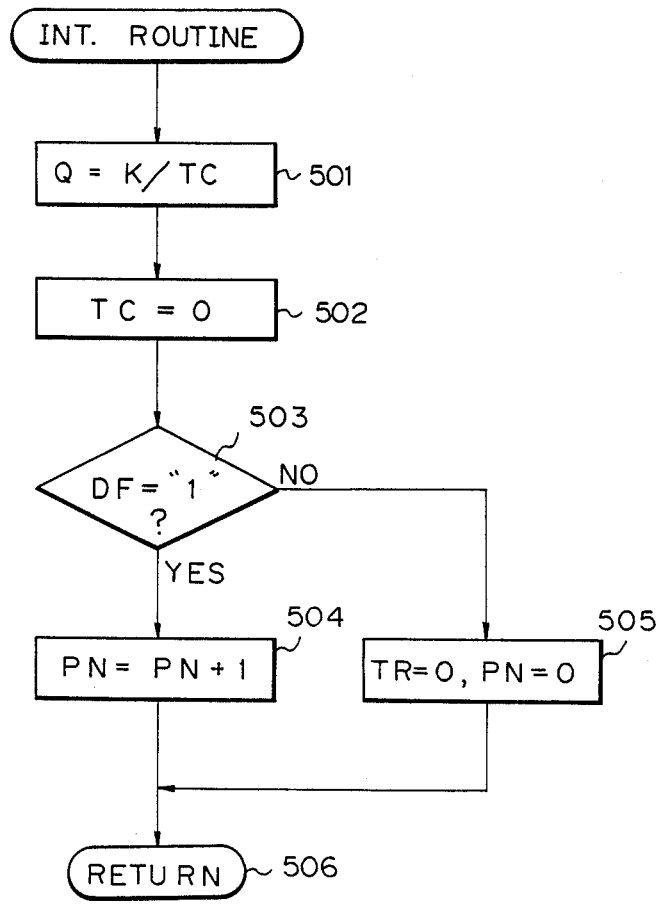

FIG. 5 is a routine executed at every fall of the pulse-shaped signal from the air flow sensor 3. At step 501, the intake air amount Q is calculated by $$Q = K/TC$$

where K is a constant value. Then the counter TC is reset at step 502. Therefore, as long as the air flow sensor 3 is in a normal state, that is, as long as the pulse signal is transmitted to the control circuit 10 from the air flow sensor 3, the counter TC is reset periodically and the counter TC does not exceed a predetermined value $TC_0$ which indicates an abnormal state.

At step 503, a determination of whether or not a flag DF equals "1" is executed. The flag DF is used for determining whether or not the air flow sensor 3 is in a normal state. In this case, DF="0" indicates a normal state and DF="1" indicates an abnormal state. If DF="1" at step 504, a counter PN for counting the number of pulse signals is counted up by 1, and if DF="0" at step 505, the counters TR and PN are reset. This routine is then completed by step 506.

Figure 6:
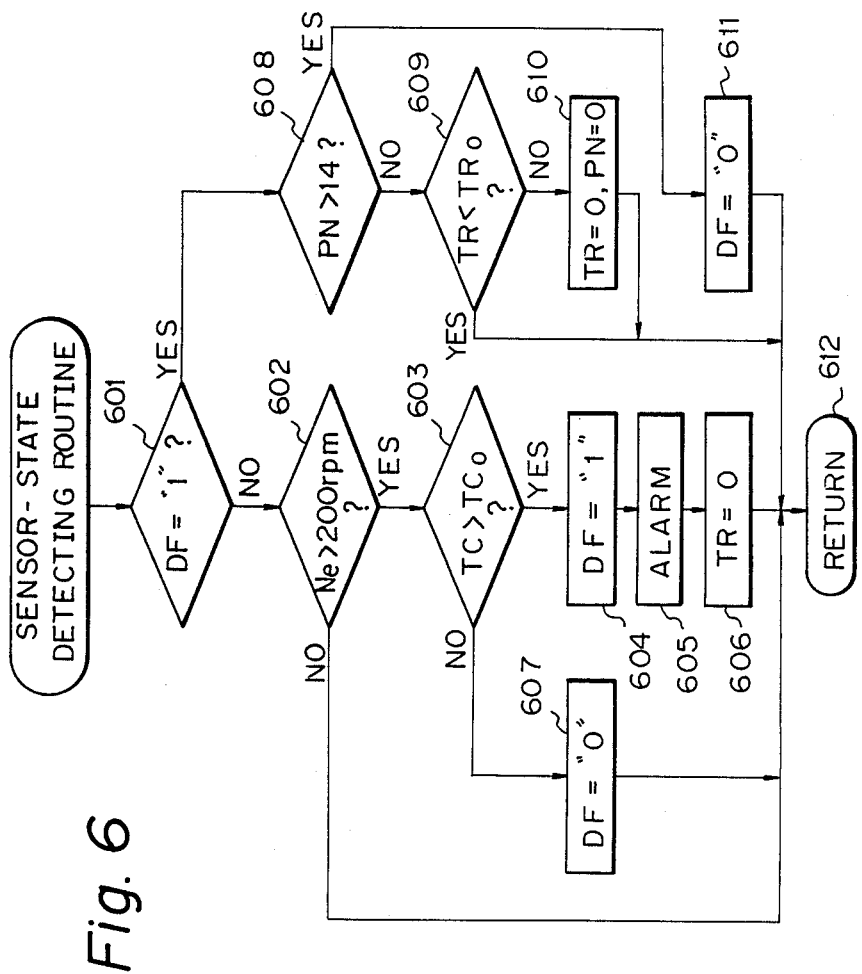

FIG. 6 is a routine for detecting the state of the air flow sensor 3. At step 601, it is determined whether or not the flag DF="1". If DF="0" (normal state), at step 602, it is determined whether or not Ne>200 rpm.

As a result, if Ne≦200 rpm, this routine is completed at step 612, and if Ne>200 rpm, the control proceed to step 603.

At step 603, it is determined whether or not the counter TC is larger than a reference time $TC_0$, by which an abnormal state in the air flow sensor 3 is determined. That is, if $TC \leq TC_0$, at step 607, the flag DF is reset and the routine is thereby completed at step 612. Contrary to this, if $TC > TC_0$ (abnormal state), at the step 604, the flag DF is set, and at step 605, an alarm is activated. Also, at step 606, the counter TR is reset. Then, this routine is completed at step 612.

As explained above, when the air flow sensor 3 is in a normal state, the control proceeds to the flow of steps 601, 602, 603, 607, and 612. When the air flow sensor 3 is in an abnormal state, the control proceeds to the flow of steps 601, 602, 603, 604, 605, 606, and 612. Conversely, the steps which will be explained hereafter are a recovery of the air flow sensor 3 from an abnormal state to a normal state. These steps will be executed when DF="1" is detected at step 601.

After DF="1" is detected at step 601, it is determined whether or not a counter PN for counting a pulse signal is larger than a predetermined value, for example, 14, at step 608. If PN≦14 at step 608, the control proceeds to step 609 and it is determined whether or not the counter TR is less than the predetermined period $TR_0$. If $TR < TR_0$, the control proceeds to step 612. Contrary to this, if $TR \leq TR_0$, the counters TR and PN are reset at step 610, and this routine is then completed at step 612. On the other hand, if PN>14 at step 608, the control proceeds to step 611, thereby resetting the flag DF. This routine is then completed at step 612. That is, if the counter PN counts 15 pulse signals in the period $TR_0$, it is determined that the air flow sensor 3 has returned to a normal state from an abnormal state.

As explained above, when the air flow sensor 3 remains in an abnormal state, the control proceeds to the flow of steps 601, 608, 609, 612, 601, 608, 609, 610, and 612. When the air flow sensor 3 returns to a normal state, the control proceeds to the flow of steps 601, 608, 609, 612, 601, 608, 611 and 612.

The flowcharts of FIG. 4 through FIG. 6 will be explained in more detail with reference to FIGS. 7A to 7E, FIGS. 8A to 8E, and FIGS. 9A to 9D.

As explained above, there are three kinds of operations of the control circuit 10 dependent upon the condition of the air flow sensor 3. A first operation is carried out when the sensor 3 is in a normal state; a second operation is carried out when the sensor 3 is in an abnormal state; and a third operation is carried out when the sensor 3 recovers from an abnormal state to a normal state.

The first operation is explained with reference to FIGS. 7A to 7E. When the key switch 7 (FIG. 1) is changed from the position IG to the position STA at time $t_1$, the starter signal STA becomes at a high level as shown in FIG. 7A, and simultaneously, the engine rotational speed signal Ne is gradually increased as shown in FIG. 7B. Shortly after time $t_1$, a signal KS as shown in FIG. 7C, transmitted to the control circuit 10 from the air flow sensor 3, is pulse-shaped. When the engine rotational speed Ne is larger than 200 rpm in FIG. 7B at time $t_2$, the counter TC is counted up as shown in FIG. 7D. The counter TC is reset at every fall of the pulse signal KS, and the counter TC is also reset when the engine rotational speed Ne is smaller than 200 rpm. (see $t_3$ to $t_4$)

Thus, when the air flow sensor 3 is in a normal state, the counter TC is reset before the counter TC reaches a predetermined value $TC_0$ when $TC > TC_0$, this indicates an abnormal state. Therefore, the abnormal flag DF remains at "0" as shown in FIG. 7E.

The second operation is explained with reference to FIGS. 8A to 8E. When the key switch 7 (FIG. 1) is changed from the position IG to the position STA at time $t_1$, the starter signal STA becomes at a high level as shown in FIG. 8A, and simultaneously, the engine rotational speed signal Ne is gradually increased as shown in FIG. 8B. In this case, the output signal of the air flow sensor 3 is not pulse-shaped, as shown in FIG. 8C. When the engine rotational speed Ne is larger than 200 rpm in FIG. 8B at time $t_2$, the counter TC is counted up as shown in FIG. 8D. The counter TC is not, however, reset because the signal KS is not pulse-shaped. Then, the counter TC is increased as time advances and, finally, at time $t_3$, the counter TC becomes larger than the predetermined value $TC_0$, thereby setting the flag DF, as shown in FIG. 8E to indicate an abnormal state.

Thus, when the air flow sensor 3 is in an abnormal state, the counter TC is always larger than the predetermined value $TC_0$, so that the flag DF becomes "1".

Figures 9A, 9B, 9C, 9D, 9E:
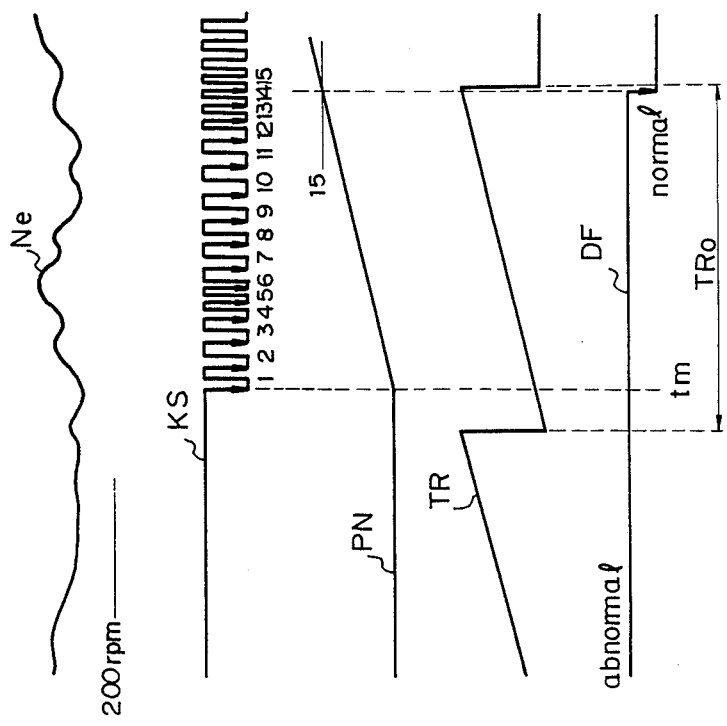

The third operation is explained with reference to FIGS. 9A to 9E. When the air flow sensor 3 is determined to be in an abnormal state, the flag DF remains as "1", as shown in FIG. 9E, under the condition that the engine rotational speed Ne is larger than 200 rpm as shown in FIG. 9A. In this case, the counter TR is periodically counted up to the value $TR_0$, as shown in FIG. 9D. The counter PN is counted up by 1 at every fall of the pulse signal KS after time tm and is reset at every time period corresponding to TR, as shown in FIG. 9C. If the counter PN becomes larger than 14, the air flow sensor 3 is determined to be in a normal state, thereby resetting the flag DF. Thus, a recovery of the air flow sensor 3 from an abnormal state to a normal state is detected.

Figure 10:
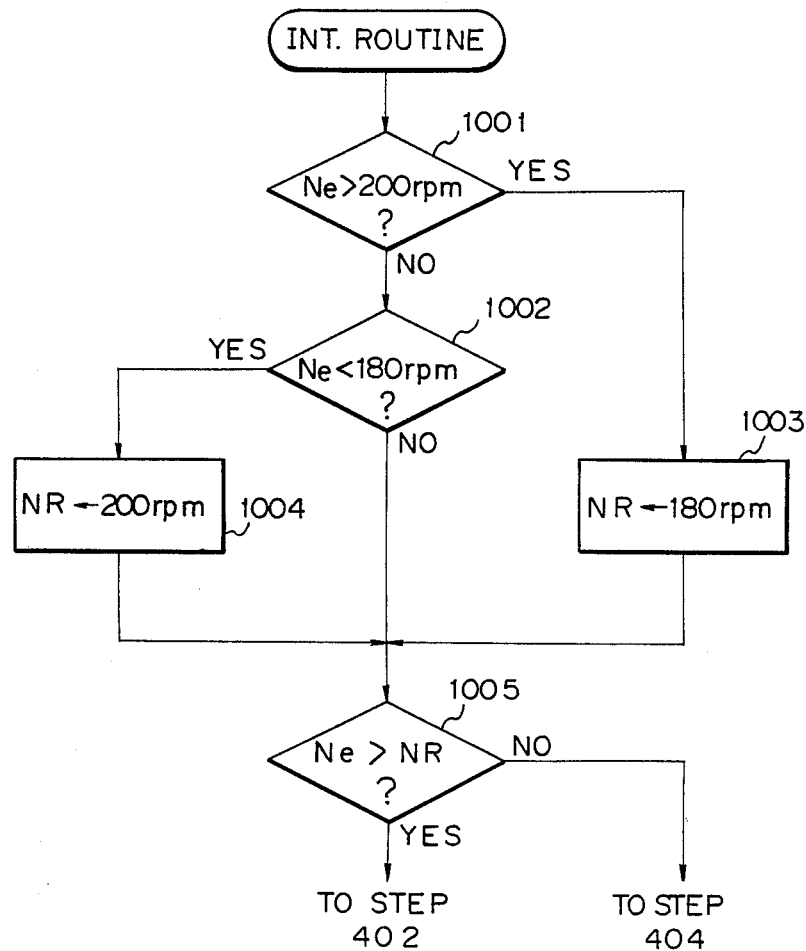

FIG. 10 is a modification of step 401 of FIG. 4. This routine is used for changing the reference speed NR for determining the operation of the counter TC. At step 1001, it is determined whether or not the engine rotational speed Ne is smaller than 200 rpm, and at step 1002, it is determined whether or not the engine rotational speed Ne is smaller than 180 rpm. If Ne<180 rpm, 200 rpm is set in the reference speed NR. However, if $180 < Ne \leq 200$ rpm, the reference speed NR is not changed. Then the control proceeds to step 1005 which determines whether or not the engine rotational speed Ne is larger than reference speed NR. If Ne>NR, the control proceeds to step 402 of FIG. 4, and if Ne≦NR, the control proceeds to step 404 of FIG. 4.

In the above mentioned operation, the flag DF is stored in the RAM 105 of the control circuit 10. Note, the flag DF may be also stored in the B-RAM 106 at the same time as the flag DF is stored in the RAM, 105, since the flag DF is not reset when the key switch 7 is OFF.

Another operation of the control circuit 10 will be explained with reference to FIGS. 5, 11, 12, 13 and 14.

Figure 11:
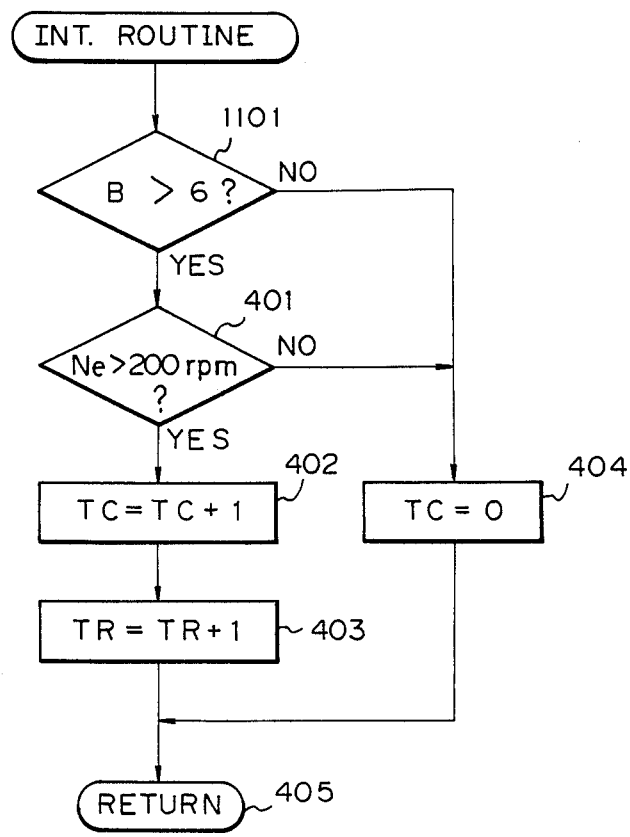

FIG. 11 is a modification of the flowchart shown in FIG. 4. In FIG. 11, a step 1101 is added to step 401 to 405 of FIG. 4. At step 1101, it is determined whether or not a supply voltage B of the air flow sensor 3 or a voltage B of a battery 8 is larger than a predetermined voltage, such as 6 V. If the voltage B is larger than 6 V, the control proceeds to the flow of steps 401 to 405, already discussed in FIG. 4. Contrary to this, if the voltage B is not larger than 6 V, the control proceeds to step 404 which resets the counter TC and then proceeds to step 405.

In this case, the routine of FIG. 5 as explained before is also executed at every fall of the pulse signal from the air flow sensor 3.

Figure 12:
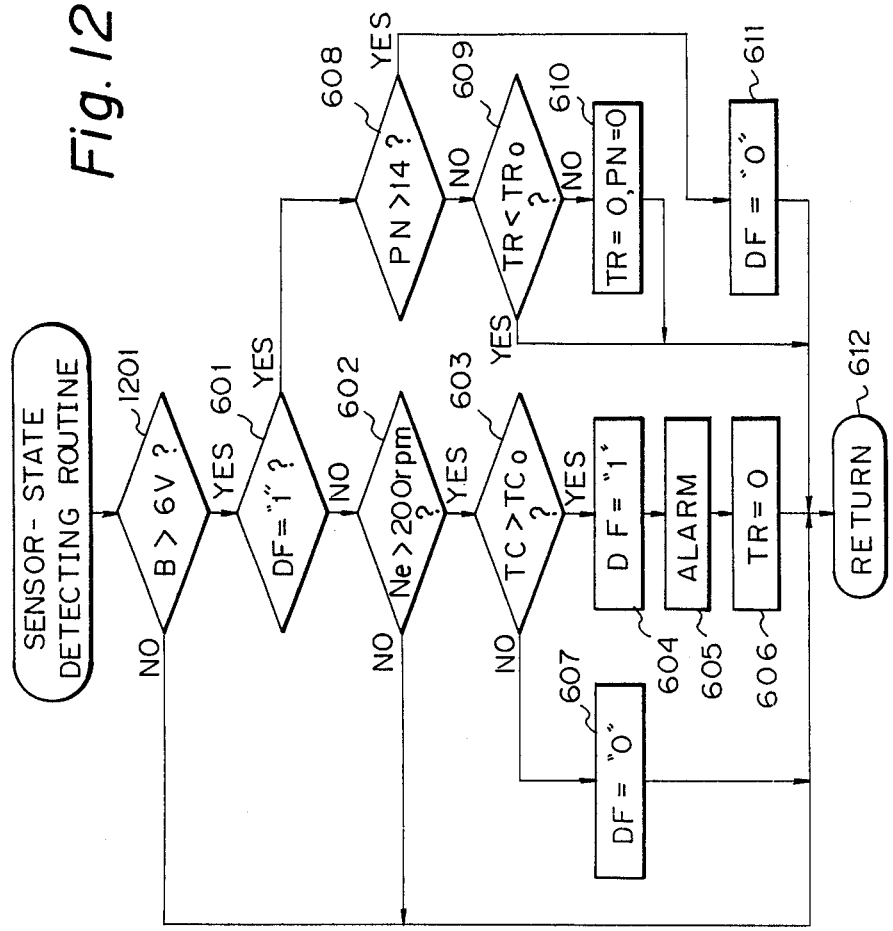

FIG. 12 is a modification of the flowchart shown in FIG. 6. In FIG. 12, step 1201 is added to step 601 to 612 of FIG. 6. At step 1201, it is determined whether or not the supply voltage B of the air flow sensor 3 or the voltage B of the battery 8 is larger than 6 V. If the voltage B is larger than 6 V, the control proceeds to the flow of steps 601 to 612, already discussed in FIG. 6. Contrary to this, if the voltage B is not larger than 6 V, the control proceeds directly to step 612.

In above mentioned operation, the flag DF is stored in the RAM 105 of the control circuit 10. Note, the flag DF may be also stored in the B-RAM 106 at the same time as the flag DF is stored in RAM 105, since the flag DF is not reset when the key switch 7 is OFF.

The flowcharts of FIGS. 11 to 12 will be explained in more detail with reference to FIGS. 13A to 13F and FIGS. 14A to 14F.

As explained before, there are three kinds of operations of the control circuit 10 dependent upon the condition of the air flow sensor 3. A first operation is carried out when the sensor 3 is in a normal state; a second operation is carried out when the sensor 3 is n an abnormal state; and a third operation is carried out when the sensor 3 recovers from an abnormal state to a normal state.

The first operation is explained with reference to FIGS. 13A to 13F. FIGS. 13A, 13B and 13D to 13F correspond to FIGS. 7A, 7B and 7C to 7E, respectively, but, FIG. 13C is added. When the key switch 7 (FIG. 1) is changed from the position IG to the position STA at time $t_1$, the starter signal STA becomes at a high level as shown in FIG. 13A, and simultaneously, the battery voltage B is remarkably reduced as shown in FIG. 13C. Then, the battery voltage B is gradually increased and the engine rotational speed Ne is gradually increased as shown in FIG. 13B.

Note that, in this operation, the air flow sensor 3 is not activated when the supply voltage B is low. Therefore, the signal KS as shown in FIG. 13D remains 0 V while the supply voltage B is low. Then, at time $t_2$ as shown in FIG. 13E, when the engine rotational speed Ne is larger than 200 rpm and the signal KD is not pulse-shaped, the counter TC is counted up as indicated by TC'. As a result, when the counter TC exceeds the predetermined value $TC_0$ at time $t_3$, if the battery voltage B is a voltage such as 5 V, i.e. lower than 6 V, the air flow sensor 3 is determined to be in an abnormal state.

Thus, the counter TC is counted up when the engine rotational speed Ne is larger than 200 rpm and the voltage B is larger than 6 V in the above-mentioned operation. That is when the voltage B is larger than 6 V in FIG. 13C at time $t_4$, the counter TC is counted up as shown in FIG. 13E. The counter TC is reset at every fall of the pulse signal KS and the counter TC is also reset when the engine rotational speed Ne is smaller than 200 rpm.

Thus, when the air flow sensor 3 is in a normal state, the counter TC is reset before the counter TC reaches a predetermined abnormal state determination value $TC_0$. Therefore, the abnormal flag DF remains at "0" as shown in FIG. 13F.

Figures 14A, 14B, 14C, 14D, 14E, 14F:
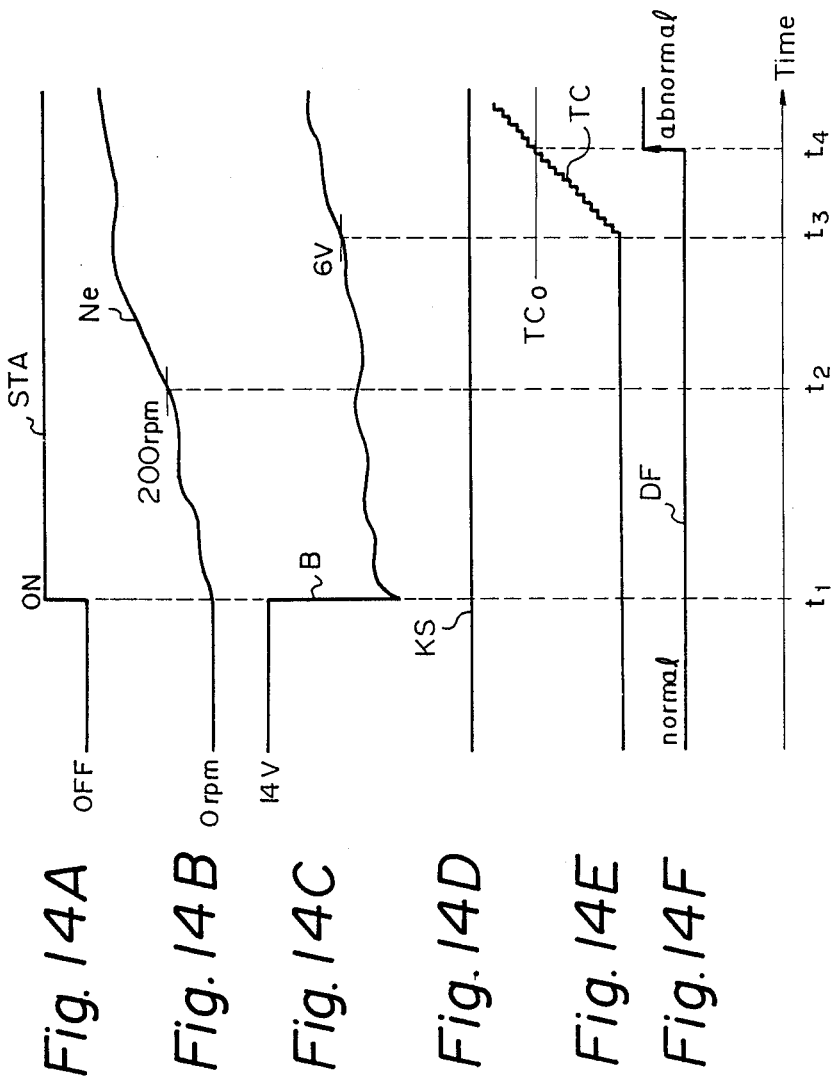

The second operation is explained with reference to FIGS. 14A to 14F. FIGS. 14A, 14B and 14D to 14F correspond to FIGS. 8A, 8B and 8C to 8E, respectively, but, FIG. 14C is added. When the key switch 7 (FIG. 1) is changed from the position IG to the position STA at time $t_1$, the starter signal STA becomes at a high level as shown in FIG. 14A, and simultaneously, the battery voltage B is remarkably reduced as shown in FIG. 14C. Then, the battery voltage B is gradually increased and the engine rotational speed NE is gradually increased as shown in FIG. 14B. In the case, the output signal of the air flow sensor 3 is not pulse-shaped, as shown in FIG. 14D. When the engine rotational speed Ne is larger than 200 rpm in FIG. 14B at time $t_2$, and the voltage B is larger than 6 V in FIG. 14C at time $t_3$, the counter TC is counted up as shown in FIG. 14E. The counter TC is not, however, reset because the signal KS is not pulse-shaped. Then, the counter TC is increased as time advances and, finally, at time $t_4$, the counter TC becomes larger than the predetermined value $TC_0$, thereby setting the flag DF, as shown in FIG. 14F.

Thus, when the air flow sensor 3 is in an abnormal state, the counter TC is always larger than the predetermined value $TC_0$, so that flag DF becomes "1".

The third operation is the same as the operation already explained in FIG. 9A to FIG. 9E.

FIG. 5 and FIG. 15 through FIG. 18 show a further operation of the control circuit 10. In this operation, the abnormal flag DF is detected in the same manner as explained above, but the alarm is not activated only by the flag DF. That is, in this operation, it is determined whether or not the engine rotational speed Ne is remarkably changed after the flag DF is set. The alarm is activated when a differential value of the engine speed Ne is larger than a predetermined value or when stalling occurs in the engine. This will be explained in more detail with reference to FIGS. 15 to 18.

Figure 15:
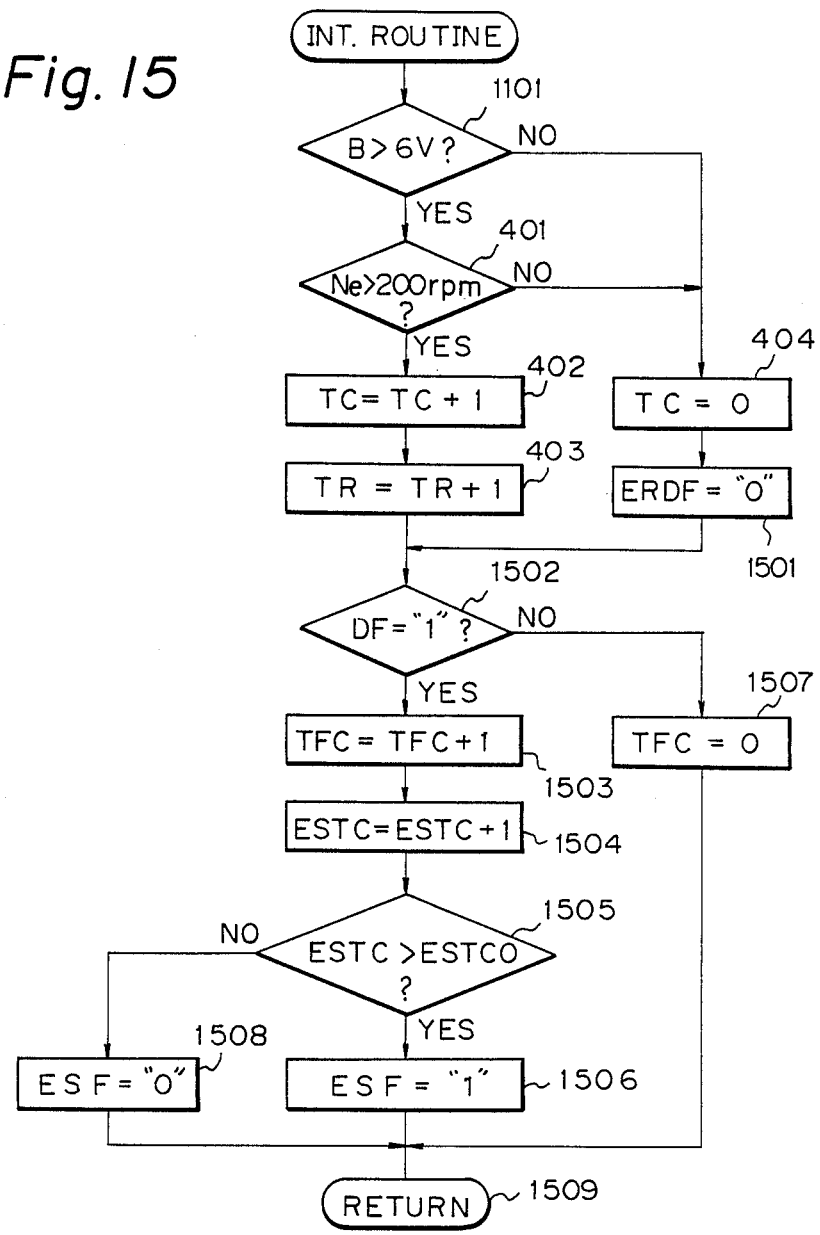

FIG. 15 is a modification of the flowchart shown in FIG. 11. In FIG. 15, steps 1501 to 1509 are added to step 1101, and 401 to 404 of FIG. 11. If $B \leq 6$ V at step 1101, or if $Ne \leq 200$ rpm at step 401, the control proceeds to steps 404 and 1501, which reset the counter TC and a flag ERDF, and then proceeds to step 1502. The flag ERDF is used for determining whether or not the differential value of the engine speed Ne is larger than the predetermined value. If $B>6$ V at step 1101 and $Ne>200$ rpm at step 401, the control proceeds to steps 402 and 403, which count up the counters TC and TR by 1 and then proceeds to step 1502.

At step 1502, it is detemined whether or not the flag DF is "1". If DF="1", the control proceeds to step 1503 where a counter TFC for counting a time duration after the flag DF is set is counted up by 1, and then, at step 1504, a counter ESTC for detecting an engine stall, is counted up by 1. Then the control proceeds to step 1505. At step 1505, it is determined whether or not the counter ESTC is larger than a predetermined time value ESTCO. When $ESTC \leq ESTCO$, the control proceeds to step 1508, which resets the engine stall flag ESF. Conversely, if $ESTC>ESTCO$ at step 1505, the control proceeds to step 1506 which sets the flag ESF, then the control proceeds to step 1509. However, if DF="1" at step 1502, the control proceeds to step 1507 which resets the flag TFC and then proceeds to step 1509. In this case, the routine of FIG. 5 as explained before is also executed at every fall of the pulse signal from the air flow sensor 3.

Figure 16:
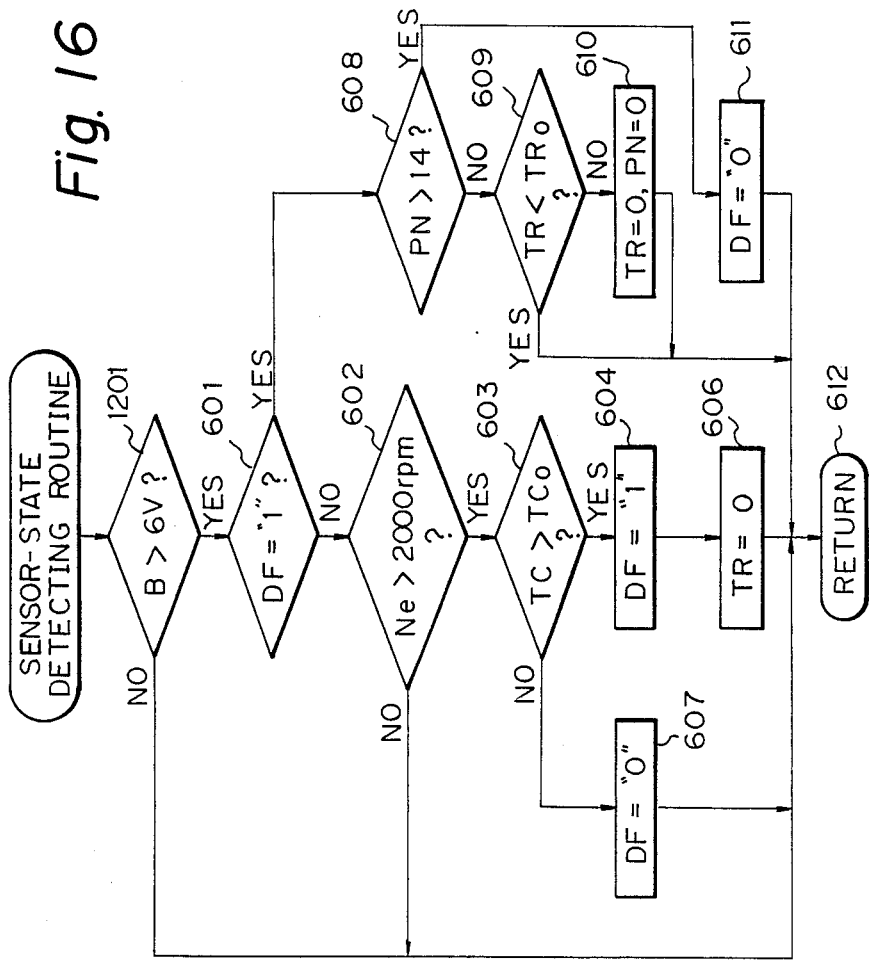

FIG. 16 is a modification of the flowchart shown in FIG. 12. The flowchart shown in FIG. 16 is the same flowchart shown in FIG. 12, except for step 605 in FIG. 12.

Figure 17:
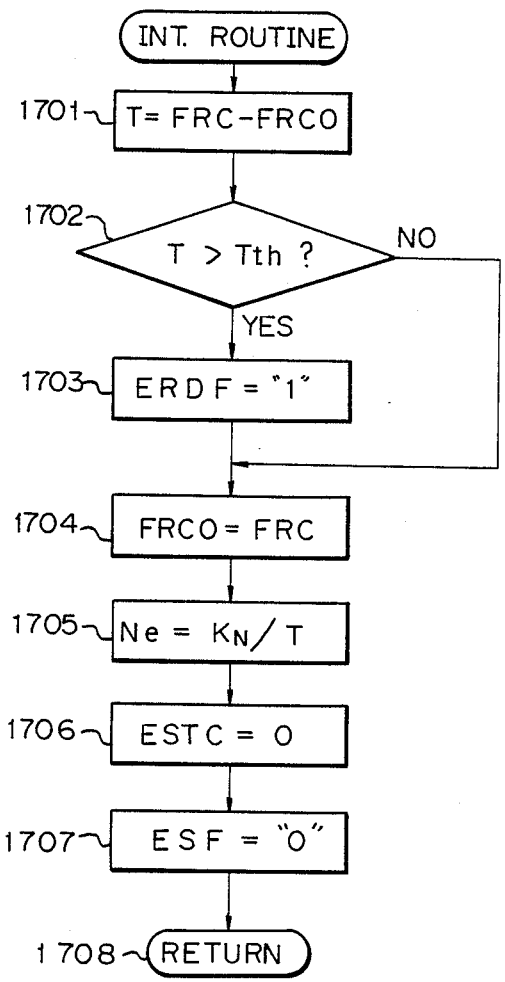

FIG. 17 is a routine which is executed at every 30° CA. Here, a counter FRC is counted up by the routine (not shown) executed at every predetermined time period. At step 1701, a time interval T for a 30° CA is calculated by $$T = FRC - FRCO$$

where FRCO is the value of the counter FRC previously read by this routine. Then the control proceeds to step 1702. At step 1702, it is determined whether or not the time interval T is larger than a predetemined time value Tth. If $T>Tth$, the control proceeds to step 1703, which sets the flag ERDF, and then proceeds to step 1704. Thus, the flag ERDF is set when the differential value of the engine rotational speed Ne falls too low. Conversely, if $T \leq Tth$, the control proceeds to step 1704.

At step 1704, FRCO is caused to be FRC, in order to prepare the next operation. Then, at step 1705, the engine rotational speed Ne is calculated using the time interval T by $$Ne = Kn/T$$

where Kn is a constant. Thereafter, the control proceeds to step 1706 which resets the counter ESTC, and then at step 1707, the flag ESF is reset, thereby completing this routine at step 1708.

Figure 18:
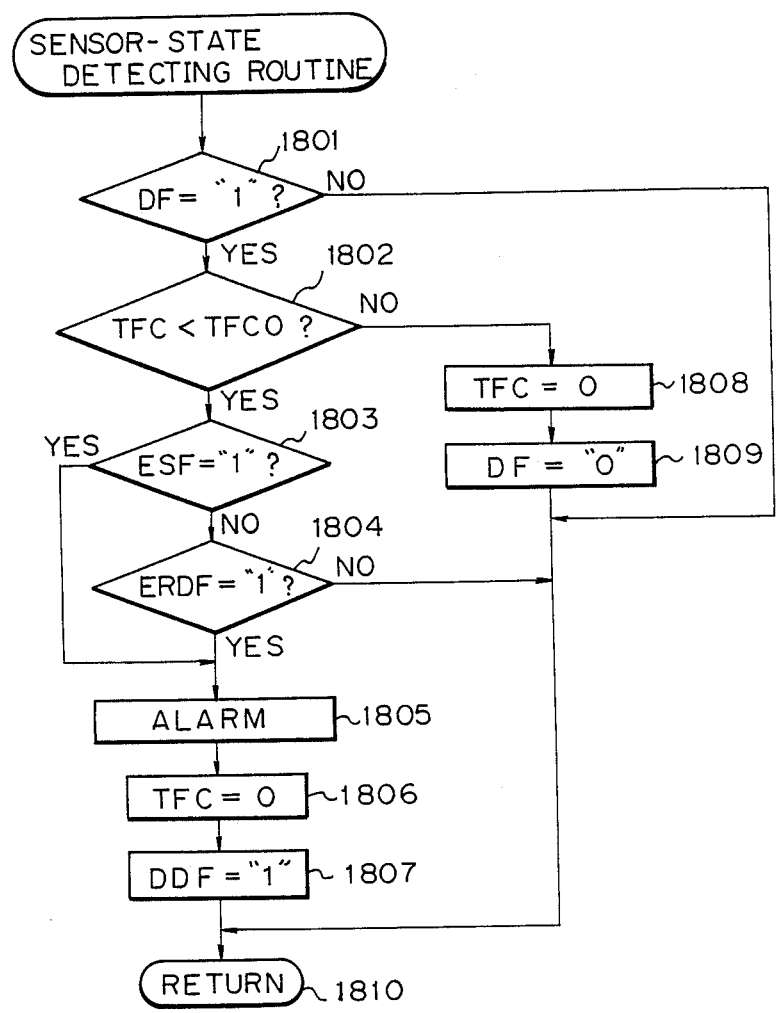

FIG. 18 is a routine for confirming the state of the air flow sensor 3. At step 1801, it is determined whether or not the flag DF equals "1". If DF="0", which means the air flow sensor 3 is in a normal state, the control proceeds directly to step 1810 and this routine is completed. Contrary to this, if DF="1" at step 1801, the control proceeds to step 1802, which determines whether or not the counter TFC is smaller than a predetermined time value TFCO. If $TFC \geq TFCO$, the control proceeds to steps 1808 and 1809, which reset the counter TFC and the abnormal flag DF respectively, and the proceeds to step 1810. If $TFC \geq TFCO$, this means that the air flow sensor 3 should not be determined as being in an abnormal state, since there was no egine stall or remarkable change in the engine rotational speed Ne when the counter TFC was counted up to the predetermined value TFCO.

On the contrary, if $TFC<TFCO$ at step 1802, the control proceeds to step 1803. At step 1803, it is determined whether or not the engine stall flag ESF equals "1". If ESF="1", the control proceeds to step 1805, which activates the alarm. If ESF="0", the control proceeds to step 1804, which determines whether or not the flag ERDF equals "1". If ERDF="0", the control proceeds directly to step 1810. Contrary to this, if ERDF="1" at step 1804, the control proceeds to step 1805, which activates the alarm. After the alarm is activated at step 1805, the control proceeds to step 1806, which resets the counter TFC, and then at step 1807, the abnormal determination flag DDF is set. The abnormal determination flag DDF is usually stored in the B-RAM 106 of the control circuit 10 in order not to be reset when the key switch is OFF. This routine is completed by step 1810.

In above mentioned operation, the flag DF is stored in the RAM 105 of the control circuit 10. Note, the flag DF may be also stored in the B-RAM 106 at the same time as the flag DF is stored in the RAM 105, since the flag DF is not reset when the key switch 7 is OFF.

As explained above, if the air flow sensor 3 is really in an abnormal state, the engine rotational speed Ne is remarkably reduced after the abnormal flag DF is set, and therefore, the alarm is activated when a remarkable reduction of the engine rotational speed Ne is detected.

The flowcharts of FIG. 15 through FIG. 18 will be explained in more detail with reference to FIGS. 19A to 19J.

As explained before, there are three kinds of operations of the control circuit 10 dependent upon the condition of the air flow sensor 3. A first operation is carried out when the sensor 3 is in a normal state; a second operation is carried out when the sensor 3 is in an abnormal state; and a third operation is carried out when the sensor 3 recovers from an abnoraml state to a normal state.

In this operation, the first operation is the same as explained with reference to FIGS. 13A to 13F. The third operation is also the same as explained with reference to FIG. 9A to FIG. 9E. Therefore, the second operation will be explained.

The second operation is explained with reference to FIGS. 19A to 19J. FIGS. 19A to FIG. 19F correspond to FIG. 14A to FIG. 14F, but FIG. 19G to FIG. 19J are added. When the key switch 7 (FIG. 1) is changed from the position IG to the positions STA at time $t_1$, the starter signal STA becomes at a high level as shown in FIG. 19A, and simultaneously, the battery voltage B falls greatly and quickly, as shown in FIG. 19C, and the engine stall flag ESF is reset as shown in FIG. 19I. Then, the battery voltage B is gradually increased, and the engine rotational speed NE is gradually increased as shown in FIG. 19B. In this case, the output signal of the air flow sensor 3 is not pulse-shaped, as shown in FIG. 19D. At time $t_2$, when both the engine rotational speed Ne is larger than 200 rpm and the voltage B is larger than 6 V, the counter TC is counted up as shown in FIG. 19E. The counter TC is not, however, reset because the signal KS is not pulse-shaped. Then, the counter TC is increased as time advances and, finally, at time $t_3$, the counter TC becomes larger than the predetermined value $TC_0$, thereby setting the flag DF as shown in FIG. 19F. Simultaneously, as shown in FIGS. 19G and 19H, the counter TFC and the counter ESTC are started to count a time duration.

The counter ESTC is reset at every 30° CA as long as the engine is rotated but the counter TFC is not reset until this counter exceeds the predetermined time value TFCO. When the counter TFC exceeds TFCO at time $t_4$, the flag DF is reset. Then the counter TFC is reset and the counter ESTC is no longer counted. The counter ESTC is reset at the next execution of the 30° CA routine.

Later, at time $t_5$, when the counter TC exceeds $TC_0$, the flag DF is set again. Simultaneously, the counters TFC and ESTC are started to count a time duration. When the engine stalls at time $T_6$, the counter ESTC is not reset, and thereby the counter ESTC exceeds the predetermined time value ESTCO at time $t_7$. As a result, the engine stall flag ESF is set, the alarm is activated, and the abnormal determination flag DDF is set. Further, although not shown in the figures, the alarm is also activated when the flag ERDF is set when the differential value of the engine rotational speed Ne exceeds the predetermined value ERDF. In this way, an abnormal state in the air flow sensor 3 is accurately detected.

The present invention can be applied to pulse train generating sensors other than air flow sensors.

We claim:

1. A method for detecting an abnormal state of an airflow sensor which generates a pulse signal according to a flow rate of intake air in an internal combustion engine, comprising the steps of:
   detecting a rotational speed of said engine;
   measuring a first time period during which said engine rotational speed is larger than a reference speed;
   resetting said first time period at every rise or fall of said pulse signal; and
   generating an abnormal state signal when first time period is larger than a predetermined time period.

2. A method for detecting an abnormal state of an air flow sensor which generates a pulse signal according to a detection of a flow rate of engine intake air in an internal combustion engine, comprising the steps of:
   detecting a rotational speed of said engine;
   measuring a first time period during which said engine rotational speed is larger than a reference speed;
   resetting said first time period at every rise or fall of said pulse signal;
   generating an abnormal state signal when said first time period is larger than a predetermined time period;
   calculating a differential value of said engine rotational speed;
   measuring a second time period after the generation of said abnormal state signal; and
   generating an abnormal state determination signal when said second time period is smaller than a predetermined time period and said differential value is larger than a predetermined value.

3. A method as set forth in claim 2, further comprising the steps of:
   detecting a supply voltage supplied to said sensor; and
   generating said abnormal state signal when said detected voltage is larger than a predetermined voltage and said first time period is larger than said predetermined time period.

4. A method as set forth in claim 2, further comprising the steps of:
   detecting a supply voltage of a battery; and
   generating said abnormal state signal when said detected voltage is larger than a predetermined voltage and said first time period is larger than said predetermined time period.

5. A method as set forth in claim 2, further comprising the steps of:
   determining whether or not said engine rotational speed is smaller than a first predetermined speed;
   determining whether or not said engine rotational speed is larger than a second predetermined speed which is larger than said first predetermined speed;
   setting said second predetermined speed to a reference speed when said engine rotational speed is smaller than said first predetermined speed; and setting said first predetermined speed to said reference speed with said engine rotational speed is larger than said second predetermined speed.

6. A method as set forth in claim 2, further comprising a step of prohibiting the generation of said abnormal state determination signal when said second time period is smaller than a predetermined time period and the differential value of said engine rotational speed is smaller than said predetermined value.

7. A method as set forth in claim 2, further comprising the step of detecting an engine stall condition; and
wherein said generating an abnormal state determination signal step determines said signal when a second time period is smaller than said predetermined time period and said engine stall condition is detected.

8. A method as set forth in claim 7, wherein said engine stall condition detecting step comprises a step of detecting said engine stall condition by determining whether or not a crank angle signal is generated from said engine.

9. A method for detecting an abnormal state of an air flow sensor which generates a pulse signal according to a detection of a flow rate of engine intake air in an internal combustion engine, comprising the steps of:
detecting a rotational speed of said engine;
measuring a first time period during which said engine rotational speed it larger than a reference speed;
resetting said first time period at every rise or fall of said pulse signal;
generating an abnormal state signal when said first time period is larger than a predetermined time period;
counting the number of pulses from said sensor;
resetting said counted number of said pulses at every predetermined time period; and
prohibiting the generation of said abnormal state signal when said counted number of pulses is larger than a predetermined number.

10. A method as set forth in claim 9, further comprising the steps of:
detecting a supply voltage supplied to said sensor; and
generating said abnormal state signal when said detected voltage is larger than a predetermined voltage and said first time period is larger than said predetermined time period.

11. A method as set forth in claim 9, further comprising the steps of:
detecting a supply voltage of a battery; and
generating said abnormal state signal when said detected voltage is larger than a predetermined voltage and said first time period is larger than said predetermined time period.

12. A method as set forth in claim 9, further comprising the steps of:
determining whether or not said engine rotational speed is smaller than a first predetermined speed;
determining whether or not said engine rotational speed is larger than a second predetermined speed which is larger than said first predetermined speed;
setting said second predetermined speed to a reference speed when said engine rotational speed is smaller than said first predetermined speed; and
setting said first predetermined speed to said reference speed when said engine rotational speed is larger than said second predetermined speed.

13. An apparatus for detecting an abnormal state of an airflow sensor which generates a pulse signal according to a flow rate of engine intake air in an internal combustion engine, comprising:
means for detecting a rotational speed of said engine;
means for measuring a first time period during which said engine rotational speed is larger than a reference speed;
means for resetting said first time period at every rise or fall of said pulse signal; and
means for generating an abnormal state signal when said first time period is larger than a predetermined time period.

14. An apparatus for detecting an abnormal state of an airflow sensor which generates a pulse signal according to a detection of a flow rate of engine intake air in an internal combustion engine, comprising:
means for detecting a rotational speed of said engine;
means for measuring a first time period during which said engine rotational speed is larger than a reference speed;
means for resetting said first time period at every rise or fall of said pulse signal;
means for generating an abnormal state signal when said first time period is larger than a predetermined time period;
means for calculating a differential value of said engine rotational speed;
means for measuring a second time period after the generation of said abnormal state signal; and
means for generating an abnormal state determination signal when said second time period is smaller than a predetermined time period and said differential value is larger than a predetermined value.

15. An apparatus as set forth in claim 14, further comprising:
means for detecting a supply a voltage supplied to said sensor; and
means for generating said abnormal state signal when said detected voltage is larger than a predetermined voltage and said first time period is larger than said predetermined time period.

16. An apparatus as set forth in claim 14, further comprising:
means for detecting a supply voltage of a battery; and
means for generating said abnormal state signal when said detected voltage is larger than a predetermined voltage and said first time period is larger than said predetermined time period.

17. An apparatus as set forth in claim 14, further comprising:
means for determining whether or not said engine rotational speed is smaller than a first predetermined speed;
means for determining whether or not said engine rotational speed is larger than a second predetermined speed which is larger than said first predetermined speed;
means for setting said second predetermined speed to a reference speed when said engine rotational speed is smaller than said first predetermined speed; and
means for setting said first predetermined speed to said reference speed when said engine rotational speed is larger than said second predetermined speed.

18. An apparatus as set forth in claim 14, further comprising means for prohibiting the generation of said abnormal state determination when said second time period is smaller than a predetermined time period and the differential value of said engine rotational speed is smaller than said predetermined value.

19. An apparatus as set forth in claim 14, further comprising:
   means for detecting an engine stall; and
   said means for generating an abnormal state determination signal generates said signal when a second time period is smaller than said predetermined time period and said engine stall is detected.

20. An apparatus as set forth in claim 19, wherein said engine stall detecting means comprises a means for detecting said engine stall by determining whether or not a crank angle signal is generated form said engine.

21. An apparatus for detecting an abnormal state of an airflow sensor which generates a pulse signal according to a detection of a flow rate of engine intake air in an internal combustion engine, comprising:
   means for detecting a rotational speed of said engine;
   means for measuring a first time period during which said engine rotational speed is larger than a reference speed;
   means for resetting said first time period at every rise or fall of said pulse signal;
   means for generating an abnormal state signal when said first time period is larger than a predetermined time period;
   means for counting the number of pulses from said sensor;
   means for resetting said counted number of said pulses at every predetermined time period; and
   means for prohibiting the generation of said abnormal state signal when said counted number of pulses is larger than a predetermined number.

22. An apparatus as set forth in claim 21, further comprising:
   means for detecting a supply voltage supplied to said sensor; and
   means for generating said abnormal state signal when said detector voltage is larger than a predetermined voltage and said first time period is larger than said predetermined time period.

23. An apparatus as set forth in claim 21, further comprising:
   means for detecting a supply voltage of a battery; and
   means for generating said abnormal state signal when said detector voltage is larger than a predetermined voltage and said first time period is larger than said predetermined time period.

24. An apparatus as set forth in claim 21, further comprising:
   means for determining whether or not said engine rotational speed is smaller than a first predetermined speed;
   means for determining whether or not said engine rotational speed is larger than a second predetermined speed which is larger than said first predetermined speed;
   means for setting said second predetermined speed to a reference speed when said engine rotational speed is smaller than said first predetermined speed; and
   means for setting said first predetermined speed to said reference speed when said engine rotational speed is larger than said second predetermined speed.

* * * * *